(12) United States Patent
Nilsson et al.

(10) Patent No.: US 9,321,896 B2
(45) Date of Patent: Apr. 26, 2016

(54) POLYMER COMPOSITION

(75) Inventors: Daniel Nilsson, Gothenburg (SE); Jerker Martensson, Alingsas (SE)

(73) Assignee: BOREALIS AG, Vienna (AT)

( * ) Notice: Subject to any disclaimer, the term of this patent is extended or adjusted under 35 U.S.C. 154(b) by 222 days.

(21) Appl. No.: 13/141,066

(22) PCT Filed: Dec. 1, 2009

(86) PCT No.: PCT/EP2009/066140
§ 371 (c)(1),
(2), (4) Date: Sep. 12, 2011

(87) PCT Pub. No.: WO2010/069755
PCT Pub. Date: Jun. 24, 2010

(65) Prior Publication Data
US 2011/0315424 A1    Dec. 29, 2011

(30) Foreign Application Priority Data
Dec. 19, 2008   (EP) ..................... 08172386

(51) Int. Cl.
C08K 5/01 (2006.01)
C08F 8/00 (2006.01)
C08K 5/00 (2006.01)
H01B 3/44 (2006.01)

(52) U.S. Cl.
CPC ............ C08K 5/0025 (2013.01); C08F 8/00 (2013.01); C08K 5/01 (2013.01); H01B 3/441 (2013.01)

(58) Field of Classification Search
CPC .......... C08K 5/0025; C08K 5/01; C08F 8/00; C08J 2323/06; C08J 2323/08; C08J 2323/16; H01B 3/441
USPC ...... 525/242, 275, 313, 319, 333.7; 427/117, 120, 118; 174/110 SR, 174/120 SR, 110 PM
See application file for complete search history.

(56) References Cited

U.S. PATENT DOCUMENTS

| | | | |
|---|---|---|---|
| 3,643,007 A * | 2/1972 | Roberts et al. ............ | 174/106 R |
| 4,376,847 A * | 3/1983 | Matsubara et al. .......... | 525/262 |
| 4,855,360 A | 8/1989 | Duchesne | |
| 6,534,119 B1 * | 3/2003 | Tsuji et al. .................... | 427/117 |
| 7,968,623 B2 | 6/2011 | Easter | |
| 2006/0025734 A1* | 2/2006 | Flohr et al. .................... | 604/368 |
| 2006/0293458 A1* | 12/2006 | Chung et al. .................. | 525/192 |
| 2007/0087198 A1* | 4/2007 | Dry .............................. | 428/408 |
| 2007/0181333 A1* | 8/2007 | Belli et al. ................ | 174/105 R |
| 2011/0260343 A1* | 10/2011 | Burgoyne et al. ............. | 257/792 |

FOREIGN PATENT DOCUMENTS

| | | | |
|---|---|---|---|
| DE | 2909152 | * | 3/1980 |
| EP | 0 009 268 A | | 4/1980 |
| EP | 009268 A1 | * | 4/1980 |
| WO | 99/40589 A | | 8/1999 |
| WO | WO 99/40589 | * | 8/1999 |
| WO | WO 00/36612 | | 6/2000 |
| WO | 02/052582 A | | 7/2002 |
| WO | 2006/014852 A | | 2/2006 |

OTHER PUBLICATIONS

Rule et al., Macromolecules 38 (2005) 7266-7273.*
Hawley's Condensed Chemical Dictionary, 1997, pp. 819 and 903.*
Derwent Acc. No. 1980-20452c (1983), Derwent Title and Abstract of DE 2909152.*
Rule J.D., et al., "Polymerizations Initiated by Diradicals from Cycloaromatization Reations" Macromolecules, ACS, Washington, DC, US, vol. 38, No. 17, dated Aug. 23, 2005, pp. 7266-7273.
International Search Report and Written Opinion, International Application No. PCT/EP2009/066140 dated Feb. 5, 2010.

* cited by examiner

*Primary Examiner* — Roberto Rabago
(74) *Attorney, Agent, or Firm* — Knobbe, Martens, Olson & Bear, LLP

(57) ABSTRACT

The invention relates to a method for modifying a polymer composition, to modified polymer compositions, to an article, preferably wire or cable, comprising said modified polymer composition, to a process for preparing an article, preferably a wire or cable, to the use of said modified polymer in one or more layers of a wire or cable, as well as to a compound for use as a radical generating compound for modifying a polymer composition.

34 Claims, No Drawings

POLYMER COMPOSITION

CROSS REFERENCE TO RELATED APPLICATIONS

This application is the U.S. National Phase of International Application No. PCT/EP2009/066140, filed Dec. 1, 2009, designating the U.S. and published as WO 2010/069755 on Jun. 24, 2010 which claims the benefit of European Patent Application No. 08 172386.8 filed Dec. 19, 2008.

FIELD OF INVENTION

The invention relates to a polymer composition comprising a free radical generating compound, a process for modifying such a polymer composition, preferably for crosslinking it, to a modified polymer composition, preferably to a crosslinked polymer composition, to an article, preferably a wire or cable, comprising said modifiable, preferably crosslinkable, polymer composition, to a modified, preferably crosslinked, polymer composition, to a process for preparing an article, preferably a wire or cable comprising said polymer composition, as well as to the use of said polymer composition in one or more layers of a wire or cable.

BACKGROUND ART

It is known to use free radical generating compounds to modify a product, such as a polymer composition via a radical reaction.

Free radical generating compounds are used e.g. to initiate (a) crosslinking in a polymer, i.a. primarily a formation of interpolymer crosslinks (bridges) by radical reaction, (b) grafting in a polymer, i.e. introduction of compounds to a polymer chain (to backbone and/or side chains) by radical reaction, and (c) visbreaking a polymer, i.e. modification of melt flow rate (MFR) of a polymer by radical reaction. These polymer modifications are well known in the art.

When added to a polymer composition, free radical generating compounds act by generating radicals, typically by decomposing to radicals, under conditions which enable the radical formation. The decomposed radicals initiate further radical reactions within a polymer composition. The resulting decomposition products of the free radical generating compound are typically a result of several reactions of the decomposition products of initial radical forming reaction. Said resulting decomposition products typically remain in the modified polymer and may include detrimental, undesired decomposition products. Peroxides are very common free radical generating compounds used i.a. in the polymer industry for said polymer modifications. The resulting decomposition products of peroxides may include volatile by-products. For example, dicumylperoxide, which is commonly used peroxide in polymer field, decomposes i.a. to methane, acetophenone and cumylalcohol during the radical formation step, e.g. during a crosslinking step. The formed gaseous methane ($CH_4$) is flammable, explosive and volatile and thus a risk in a working environment.

In wire and cable applications a typical cable comprises at least one conductor surrounded by one or more layers of polymeric materials. In some power cables, including low voltage (LV), medium voltage (MV), high voltage (HV) and extra high voltage (EHV) cables, said conductor is surrounded by several layers including an inner semiconductive layer, an insulation layer and an outer semiconductive layer, in that order. The cables are commonly produced by extruding the layers on a conductor. The polymer material in one or more of said layers is then typically crosslinked to improve i.a. heat and deformation resistance, creep properties, mechanical strength, chemical resistance and abrasion resistance of the polymer in the layer(s) of the cable. The free radical generating compound, such as a peroxide, is typically incorporated to the layer material prior to the extrusion of the layer(s) on a conductor. After formation of the layered cable, the cable is then subjected to a crosslinking step to initiate the radical formation and thereby crosslinking reaction.

The decomposition products of the free radical generating compound remain mostly captured within the cable layer after crosslinking. This can cause problems in view of the cable manufacturing process as well as in view of the quality of the final cable.

Accordingly, after crosslinking the cable must be cooled with great care to prevent the gaseous volatile decomposition products like methane forming voids within the polymer layer. These voids have typically an average diameter of between 10 to 100 μm. Partial discharges can take place in such voids within a cable that is subjected to an electrical field and thereby reduce the electrical strength of the cable.

Particularly the MV, HV and EHV power cables must have high layer quality in terms of safety during installation and in end use thereof. In service, volatile decomposition products in a cable resulting from a crosslinking step can create a gas pressure and thus cause defects in the shielding and in the joints.

For the above reasons the volatile decomposition products, such as methane e.g. where dicumylperoxide is used, are conventionally reduced to a minimum or removed after crosslinking and cooling step. Such removal step is generally known as a degassing step. The degassing step is time and energy consuming and is thus a costly operation in a cable manufacturing process. Degassing requires large heated chambers which must be well ventilated to avoid the build-up of, for example, flammable methane and ethane. The cable, typically wound to cable drums, is normally degassed at elevated temperature in the range of 50-80° C., e.g. 60-70° C., for lengthy time periods. At these temperatures however, thermal expansion and softening of the insulation can occur and lead to undue deformation of the formed cable layers resulting directly in failures of the cable. The degassing of MV, HV and EHV cables with high cable weight needs thus often be carried out at decreased temperatures.

U.S. Pat. No. 5,618,900 describes a polymerisation process of monomers using an initiator which can be a ene-diyne compound amongst others. The amount of the initiator used in the polymerisation is stated to be 10 to 2000 ppm.

Accordingly, there is a need to find new solutions to overcome the prior art problems.

OBJECTS OF THE INVENTION

One of the objects of the present invention is to provide alternative free radical generating compounds for modifying, preferably crosslinking, a polymer composition which compounds enable to avoid the formation of undesirable by-products, such as gaseous decomposition products, like $CH_4$, thereof during the modification reaction.

A further object of the invention is to provide an alternative polymer composition for use in many end applications of polymers, i.a. in wire and cable applications, which enable the modification, preferably crosslinking, of a polymer of said composition with reduced or no formation of undesirable by-products.

Another object of the invention is to provide an alternative article produced from said polymer composition, such as a cable which comprises one or more layers comprising said polymer composition, which can be modified, preferably crosslinked, resulting in a modified article with excellent properties useful i.a. in W&C applications.

A further object of the invention is to provide an alternative process for producing an article using said polymer composition, preferably a cable, which process enables the preparation of high quality products and if desired, with shorter production time and/or lower energy consumption.

A still further object of the invention is to provide an alternative method for modifying, preferably crosslinking, a polymer composition to obtain a highly advantageous modified polymer composition.

The invention and further objects thereof are described and defined in details below.

DESCRIPTION OF THE INVENTION

The objects of the invention are solved by the polymer compositions, modified polymer compositions, articles comprising the polymer composition of the invention and processes for producing the polymer composition as defined below and in the claims.

Polymer Compositions of the Invention

Viewed from one aspect the invention provides a polymer composition comprising at least:
A) a polymer, and
B) a free radical generating compound which is a diradical generating compound, more preferably a diradical generating compound which contains sites of C—C unsaturation which cyclizes to form a diradical.

Viewed from another aspect the invention provides a polymer composition comprising at least:
A) a polymer, and
B) a free radical generating compound which is a cis-ene-diyne compound.

In a preferred embodiment of the invention B) the free radical generating compound is a cis-ene-diyne compound of formula (I):

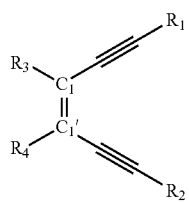

(I)

wherein
$R_1$ and $R_2$ are each independently H, substituted or unsubstituted saturated or partially unsaturated hydrocarbyl group which optionally contains one or more heteroatom(s); or a substituted or unsubstituted aromatic hydrocarbyl group which optionally contains one or more heteroatom(s); or $R_1$ and $R_2$ form together a divalent substituted or unsubstituted saturated or partially unsaturated hydrocarbyl group which optionally contains 1 to 4 heteroatoms, wherein $R_1$ is linked to $C_1$ and $R_2$ to $C_{1'}$, respectively, forming together with $C_1$=$C_{1'}$ a substituted or unsubstituted partially unsaturated cyclic hydrocarbyl or substituted or unsubstituted aromatic hydrocarbyl ring moiety of 6 to 14 C-atoms:
$R_3$ and $R_4$ are each independently H, substituted or unsubstituted saturated or partially unsaturated hydrocarbyl group which optionally contains one or more heteroatom(s), a substituted or unsubstituted aromatic hydrocarbyl group which optionally contains one or more heteroatom(s); or $R_3$ and $R_4$ together with the carbon atoms $C_1$ and $C_{1'}$, to which each, respectively, is attached form an unsubstituted or substituted partially unsaturated cyclic hydrocarbyl moiety which has carbon atoms and optionally from 1 to 4 heteroatom(s) as ring-atoms; or $R_3$ and $R_4$ together with the carbon atoms $C_1$ and $C_{1'}$, to which each, respectively, is attached form an unsubstituted or substituted cyclic aromatic hydrocarbyl moiety which has carbon atoms as ring-atoms and optionally from 1 to 4 heteroatom(s) as ring-atoms.

The polymer composition of the invention is referred herein also shortly as Polymer Composition. The term "Compound (B)" is commonly used herein for the diradical generating compound, for the preferable cis-ene-diyne compound and for the more preferable compound of formula (I) as the free radical generating compound (B) of the Polymer Composition. The compound of formula (I) as the free radical generating compound (B) of the Polymer Composition is referred herein also as Compound (I).

Surprisingly, the polymer (A) can be modified, preferably crosslinked, using the diradical generating compounds, preferably cis-ene-diynes, more preferably compounds of formula (I), as defined above. Unexpectedly it is possible to effect such modification in conditions wherein the Compound (B) as defined above, preferably the Compound (I), interact with a polymer. Moreover, due to the basic structure of the Compound (B) as defined above the modification reaction of the Compounds (B), preferably of the compounds of formula (I), provides minimal, or in practice, no undesirable by-products, such as gaseous by-products, like methane.

The nature of the by-products formed from said Compounds (B) can be tailored within the scope of the Compounds (B) depending on the desired end application.

The modifying, preferably crosslinking, of the polymer composition means that at least the polymer (A) is modified, preferably crosslinked, via the action of the diradical generating compound, preferably of cis-ene-diyne, more preferably of compound of formula (I) as defined above or below.

Modification, preferably, crosslinking can be effected by irradiation or by heating the polymer composition at diradical generating temperatures. Preferably, the modification, preferably crosslinking is carried out by heating.

Moreover, the crosslinking of a polymer composition of the invention using the diradical generating compound can provide very advantageous mechanical properties to the obtained crosslinked polymer composition. Furthermore, the crosslinking can result to a crosslinking degree of the crosslinked polymer composition which provides advantageous mechanical properties that are very desirable for a cable layer material in wire and cable applications. The crosslinking degree can be determined by means of gel content according to ASTM D2765-01 as defined under Determination methods.

The Polymer Composition may comprise more than one polymer (A) which are different, or further polymer components. The Polymer composition may also comprise further components, e.g. polymer components other than polymer (A) and/or additives, which may be those conventionally used in polymer compositions. Examples of such additives comprise i.a. antioxidant(s), stabiliser(s), processing aid(s), crosslinking booster(s), scorch retarders (SR), flame retardant additive(s), water tree retardant additive(s), acid scavenger(s), inorganic filler(s), voltage stabilizer(s), and any mixtures thereof, which may be used in conventional amounts.

Further preferably, the Polymer Composition contains less than 1000 ppm of unreacted monomer.

Preferably the Polymer Composition of the invention is used for producing articles, such as layer(s) of a cable. For such use the Polymer Composition may be provided in the form of (1) a polymer powder, (2) polymer pellets or (3) a melt mixture comprising the Polymer Composition. In the preferred embodiment the Polymer Composition is provided in the form of (2) polymer pellets which are melted during the article forming process. Pellets are understood herein as solid particles of any size and shape which are formed by compounding, e.g. in a pelletising extruder. Polymer pellets and the preparation process thereof are well known in the prior art.

It is known that high purity is required in wire an cable applications. Thus the good mechanical properties together with reduced volatile content of the crosslinked polymer composition makes the invention highly useful for wire and cable applications, preferably for producing a crosslinked cable.

In the preferred embodiment of the Polymer Composition the diradical generating compound (B) as defined above is a cis-ene-diyne compound, more preferably a compound of formula (I) as defined above or below.

Compound of Formula (I) as the Free Radical Generating Compound (B) of the Polymer Composition Preferred aspects are discussed below with respect to compounds of formula (I).

The following subgroups of the compound of formula (I) of the invention represent some preferable embodiments and variants of the invention. It is also understood that said below subgroups further specify the substituents given above in formula (I). Each subgroup definition can be combined with any other subgroup to define further preferred subgroups within the broadest scope of compounds of formula (I) of the invention.

Preferably in the compounds of formula (I):

When any of $R_1$, $R_2$, $R_3$ or $R_4$ is said optionally substituted saturated or partially unsaturated hydrocarbyl group or an optionally substituted aromatic hydrocarbyl group as defined above, then it is preferably said substituted or unsubstituted saturated or partially unsaturated hydrocarbyl group.

When any of $R_1$, $R_2$, $R_3$ or $R_4$ is said substituted or unsubstituted saturated or partially unsaturated hydrocarbyl group as defined above, then it is independently selected from:

(i) an optionally substituted straight or branched chain saturated or partially unsaturated hydrocarbyl group, (ii) an optionally substituted straight or branched chain saturated or partially unsaturated hydrocarbyl group which bears a saturated or partially unsaturated cyclic hydrocarbyl moiety or an optionally substituted straight or branched chain saturated or partially unsaturated hydrocarbyl group which bears an aromatic hydrocarbyl moiety; preferably an optionally substituted straight or branched chain saturated or partially unsaturated hydrocarbyl group which bears a saturated or partially unsaturated cyclic hydrocarbyl moiety, or (iii) an optionally substituted saturated or partially unsaturated cyclic hydrocarbyl group.

When any of said optionally substituted saturated or partially unsaturated hydrocarbyl group or optionally substituted aromatic hydrocarbyl group as $R_1$, $R_2$, $R_3$ or $R_4$ contains optionally one or more heteroatom(s), then these are preferably selected independently from atoms different from C and H, such as from Si, N, P, O or S, preferably N or O.

When $R_3$ and $R_4$ together with the carbon atoms $C_1$ and $C_{1'}$, to which each, respectively, is attached form an unsubstituted or substituted partially unsaturated cyclic hydrocarbyl moiety having carbon atoms and optionally from 1 to 4 heteroatom(s) as ring-atoms, or an unsubstituted or substituted cyclic aromatic hydrocarbyl moiety having carbon atoms as ring-atoms and optionally from 1 to 4 heteroatom(s) as ring-atoms, then the optional heteroatoms are selected independently from atoms different from C and H, such as from Si, N, P, O or S, preferably N or O.

Any of the substituents $R_1$, $R_2$, $R_3$ or $R_4$ or the cyclic ring moiety formed by substituents $R_3$ and $R_4$ or, respectively, by substituents $R_1$ and $R_2$ of compounds of formula (I), as defined above, may each independently optionally carry substituent(s), preferably 1 to 4 substituents, more preferably one substituent, if any. Said optional substituent(s) may preferably be selected each independently from a functional group; a saturated or partially unsaturated hydrocarbyl group optionally bearing a functional group; or an aromatic hydrocarbyl group optionally bearing a functional group, as defined below, preferably from C1-30 hydrocarbyl group, more preferably C1-12 hydrocarbyl group (e.g. C1-6 alkyl) or from a functional group.

The term "functional group" as a substituent is a well known expression and comprises, preferably consists of, groups selected from i.a. —OH; —NR$_2$, wherein each R is independently —H or ($C_1$-$C_{12}$)alkyl-; —COR", wherein R" is i.a. —H, ($C_1$-$C_{12}$)alkyl- or —NR$_2$, wherein each R is as defined for —NR$_2$; —COOR", wherein R" is as defined for —COR"; halogen, such as —F, —Cl, —Br or —I; alkoxy, e.g. —OC$_{1-12}$alkyl; -nitro; thiol-; -thioC$_{1-12}$alkyl or —CN.

The term "optional" means "may or may not be present", e.g. "optionally substituted" cover the possibilities that a substituent(s) is present or that no substituent(s) is present. The term "unsubstituted" naturally means that no substituent(s) is present.

The expression "partially unsaturated" in above option for (i) straight or branched chain hydrocarbyl as $R_1$, $R_2$, $R_3$ or $R_4$ means that the moiety comprises one or more double or triple bonds, preferably is an optionally substituted alkenyl or alkynyl group. "Partially unsaturated" in the above options (ii) or (iii) for cyclic hydrocarbyl group as $R_1$, $R_2$, $R_3$ or $R_4$ or in the variant of Compound (I) where "$R_3$ and $R_4$ together with the carbon atoms $C_1$ and $C_{1'}$, to which each, respectively, is attached form an optionally substituted partially unsaturated cyclic hydrocarbyl moiety", as defined above, means that the ring moiety contains one or more double bonds in the ring systems so that it is non-aromatic ring moiety in order to differentiate said "partially unsaturated" ring moieties from aromatic ring moieties, i.e. "aromatic hydrocarbyl groups" such as phenyl or pyridyl radicals.

Any hydrocarbyl group or aromatic hydrocarbyl group present in the $R_1$, $R_2$, $R_3$ or $R_4$ substituents of the compounds of formula (I) invention will preferably independently have up to 50 C-atoms, preferably up to 40 C-atoms, preferably up to 30 C-atoms, e.g. up to 20 C-atoms, especially up to 12 carbon atoms.

In the option (i) for hydrocarbyl, as defined above, the optionally substituted straight (i.e. linear) or branched hydrocarbyl is preferably selected from an alkyl group, an alkenyl group or an alkynyl group, wherein each group preferably has up to 50 C-atoms, preferably up to 40 C-atoms, preferably up to 30 C-atoms, e.g. up to 20 C-atoms. Alkyl group is preferred, preferably (C1-C12)alkyl, e.g. (C1-C12)alkyl.

The cyclic hydrocarbyl for above options (ii) or (iii) for hydrocarbyl as any of $R_1$, $R_2$, $R_3$ or $R_4$, or the partially unsaturated cyclic hydrocarbyl moiety formed by substituents $R_3$ and $R_4$, or respectively, formed by substitutents $R_1$ and $R_2$ of compounds of formula (I), as defined above, is preferably a cyclic alkyl or cyclic alkenyl group, wherein each group has preferably up to 20 C atoms, especially up to 12 carbon atoms. Some highly preferred cyclic alkyl groups may have 3 to 8 carbon atoms. Preferred cyclic alkenyl groups may have 5 to 8 carbon atoms.

Preferred aromatic hydrocarbyl as any of $R_1$, $R_2$, $R_3$ or $R_4$ of Compounds (I) of in above options (ii) or (iii) for aromatic hydrocarbyl as $R_1$, $R_2$, $R_3$ or $R_4$, or the "cyclic aromatic hydrocarbyl moiety" formed by substituents $R_3$ and $R_4$, or respectively, formed by substitutents $R_1$ and $R_2$ of compounds of formula (I), as defined above, has 6 to 12 carbon atoms, more preferably is a phenyl moiety.

The term "cyclic hydrocarbyl" for the above options (ii) or (iii) for hydrocarbyl or aromatic hydrocarbyl as $R_1$, $R_2$, $R_3$ or $R_4$, or the "partially unsaturated cyclic hydrocarbyl moiety or cyclic aromatic hydrocarbyl moiety formed by substituents $R_3$ and $R_4$ of compounds of formula (I)", as defined above, means that the ring system can be monocyclic or multicyclic, preferably monocyclic. The expression "monocyclic" means ring systems with one ring, such as cyclopentyl, cyclohexyl, cycloheptyl or phenyl. The expression "multicyclic" in turn means herein fused ring systems, wherein one or more further hydrocarbyl or aromatic ring(s) are fused to the one cyclic hydrocarbyl or cyclic aromatic hydrocarbyl ring system to form bicyclic, such as naphthyl, or tricyclic etc. ring systems.

As to most preferred subgroups of the compounds of the formula (I):

In one preferable embodiment of the compounds of formula (I) of the invention $R_1$ and $R_2$ are both H and $R_3$ and $R_4$ are both independently other than H.

In one preferred embodiment (1) of compounds of formula (I), $R_1$, $R_2$, $R_3$ and $R_4$ are each independently selected from H or unsubstituted or substituted straight or branched chain hydrocarbyl groups; preferably from optionally substituted straight or branched chain (C1-C50)alkyl groups, optionally substituted straight or branched chain (C2-C50)alkenyl groups or optionally substituted straight or branched chain (C2-C30)alkynyl groups; more preferably from optionally substituted straight or branched chain (C1-C50)alkyl groups, preferably (C1-C30)alkyl groups, more preferably straight or branched chain (C1-C20)alkyl groups, such as methyl, ethyl, propyl, butyl, pentyl, hexyl, heptyl, octyl, decyl, undecyl or docedyl groups, wherein each of said straight or branched chain may optionally contain one or more, preferably one to three, more preferably one heteroatom preferably selected from N, O, P or S, more preferably from N or O, such as (C1-C6)alkyl-O—(C1-C6)alkyl group. In this embodiment (1) straight chain hydrocarbyl groups are preferred. Further preferably in this embodiment $R_1$ and $R_2$ are identical groups and $R_3$ and $R_4$ are identical groups. More preferably, $R_1$ and $R_2$ are both H and $R_3$ and $R_4$ are both hydrocarbyl groups as defined above, which are preferably identical. Optional substituent(s), preferably from 1 to 4, more preferably one substituent, if any, may be present in this embodiment in any of the substituents $R_1$, $R_2$, $R_3$ and $R_4$, as defined above. Preferably, if substituent(s) are present, they are independently selected from a functional group as defined above or from straight or branched chain (C1-C30)alkyl group, which is preferably a straight or branched chain (C1-C6)alkyl group and which optionally bears a functional group as defined above.

In another preferred embodiment (2) of compounds of formula (I), $R_1$ and $R_2$, are each independently selected from H or unsubstituted or substituted straight or branched chain hydrocarbyl groups; preferably from optionally substituted straight or branched chain (C1-C50)alkyl groups, optionally substituted straight or branched chain (C2-C50)alkenyl groups or optionally substituted straight or branched chain (C2-C30)alkynyl groups; more preferably from optionally substituted straight or branched chain (C1-C50)alkyl groups, preferably (C1-C30)alkyl groups, more preferably straight or branched chain (C1-C20)alkyl groups, such as methyl, ethyl, propyl, butyl, pentyl, hexyl, heptyl, octyl, decyl, undecyl or docedyl groups, wherein each of said straight or branched chain may optionally contain one or more, preferably one to three, more preferably one heteroatom preferably selected from N, O, P or S, more preferably from N or O, such as (C1-C6)alkyl-O—(C1-C6)alkyl group, and $R_3$ and $R_4$ together with the carbon atoms $C_1$ and $C_{1'}$ to which each, respectively, is attached form an unsubstituted or substituted partially unsaturated cyclic hydrocarbyl moiety having carbon atoms and optionally from 1 to 4 heteroatom(s) as ring-atoms, wherein the optional heteroatoms are preferably selected independently from atoms different from C and H, such as from Si, N, P, O or S, preferably from N or O.

In this embodiment (2) the cyclic hydrocarbyl moiety formed by $R_3$ and $R_4$ can be an optionally substituted mono or multicyclic, preferably monocyclic, moiety and contains preferably 5-12 ring-atoms, more preferably 5 or 6 ring-atoms. In this embodiment (2) $R_3$ and $R_4$ together with the carbon atoms $C_1$ and $C_{1'}$ to which each, respectively, is attached form preferably an unsubstituted or substituted partially unsaturated cyclic hydrocarbyl moiety having 5 or 6 ring-atoms which are carbon atoms and having one unsaturation which is the double bond between $C_1$ and $C_{1'}$, more preferably form an optionally substituted cyclopentene or cyclohexene moiety. Further in this embodiment (2) when any of $R_1$ and $R_2$ is a hydrocarbyl group, then it is preferably a straight chain hydrocarbyl group. Further preferably in this embodiment $R_1$ and $R_2$ are identical groups. More preferably, $R_1$ and $R_2$ both are H. Optional substituent(s), preferably from 1 to 4, more preferably one substituent, if any, may be present in this embodiment in any of the substituents $R_1$ or $R_2$ or in the ring moiety formed by $R_3$ and $R_4$, as defined above. Preferably, if substituent(s) are present they are at the ring moiety formed by $R_3$ and $R_4$. Any substituent(s) are preferably selected independently from a functional group or from straight or branched chain (C1-C30)alkyl, preferably from straight or branched chain (C1-C30)alkyl, more preferably (C1-C6)alkyl, group which optionally bears a functional group as defined above.

Preferred Compounds (1) of the above embodiment (2) have a formula (II):

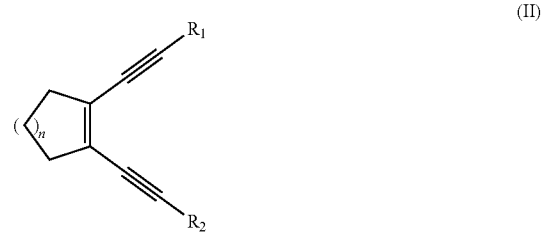

(II)

wherein $R_1$ and $R_2$ are as defined above in embodiment (2) including the preferred subgroups thereof, n is from 1 to 8, preferably 1 or 2, and the ring moiety formed by $R_3$ and $R_4$ together with the carbon atoms $C_1$ and $C_{1'}$ to which each, respectively, is attached may be optionally substituted as defined above in embodiment (2) including the preferred subgroups thereof. Accordingly the ring moiety of the preferred Compounds (1) of the embodiment (2) consists of carbon ring atoms.

In still another preferred embodiment (3) of compounds of formula (I),

- $R_1$ and $R_2$, are each independently selected from H or unsubstituted or substituted straight or branched chain hydrocarbyl groups; preferably from optionally substituted straight or branched chain (C1-C50)alkyl groups, optionally substituted straight or branched chain (C2-C50)alkenyl groups or optionally substituted straight or branched chain (C2-C30)alkynyl groups; more preferably from optionally substituted straight or branched chain (C1-C50)alkyl groups, preferably (C1-C30)alkyl groups, more preferably straight or branched chain (C1-C20)alkyl groups, such as methyl, ethyl, propyl, butyl, pentyl, hexyl, heptyl, octyl, decyl, undecyl or docedyl groups, wherein each of said straight or branched chain may optionally contain one or more, preferably one to three, more preferably one heteroatom preferably selected from N, O, P or S, more preferably from N or O, such as (C1-C6)alkyl-O—(C1-C6)alkyl group, and
- $R_3$ and $R_4$ together with the carbon atoms $C_1$ and $C_{1'}$ to which each, respectively, is attached form an unsubstituted or substituted cyclic aromatic hydrocarbyl moiety having carbon atoms and optionally from 1 to 4 heteroatom(s) as ring-atoms, wherein the optional heteroatoms are preferably selected independently from atoms different from C and H, such as from Si, N, P, O or S, preferably N.

In this embodiment (3) the cyclic aromatic hydrocarbyl moiety formed by $R_3$ and $R_4$ can be an optionally substituted mono or multicyclic, preferably monocyclic, moiety and contains preferably 5-12 ring-atoms, more preferably 5 or 6 ring-atoms, more preferably 6 ring atoms, and forms preferably an optionally substituted phenyl or pyridyl moiety, more preferably contains 5 or 6 carbon ring atoms, more preferably forms an optionally substituted phenyl moiety. In this embodiment (3) $R_3$ and $R_4$ together with the carbon atoms $C_1$ and $C_{1'}$ to which each, respectively, is attached form preferably an optionally substituted phenyl or pyridyl moiety, more preferably an optionally substituted phenyl moiety. Further in this embodiment (3) when any of $R_1$ and $R_2$ is a hydrocarbyl group, then it is preferably a straight chain hydrocarbyl group. Further preferably in this embodiment $R_1$ and $R_2$ are identical groups. More preferably, $R_1$ and $R_2$ both are H.

Optional substituent(s), preferably from 1 to 4, more preferably one substituent, may be present in this embodiment (3) in any of the substituents $R_1$ or $R_2$ or in the ring moiety formed by $R_3$ and $R_4$ as defined above. Preferably, if substituent(s) are present they are in the ring moiety formed by $R_3$ and $R_4$. Any substituent(s) are preferably selected independently from a functional group or from straight or branched chain (C1-C30) alkyl, preferably from straight or branched chain (C1-C30) alkyl, more preferably (C1-C6)alkyl, group which optionally bears functional substituent.

The most preferred compounds of formula (I) are compounds according to the embodiment (3) including any of preferable subgroups thereof. More preferably the Compounds (I) of the embodiment (3) have a formula (III);

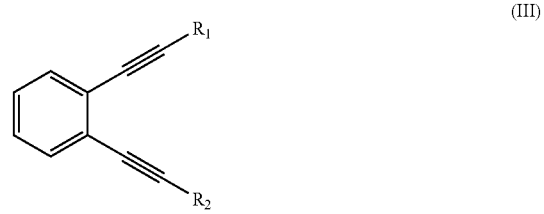

wherein $R_1$ and $R_2$ are as defined above in embodiment (3) including the preferred subgroups thereof and the phenyl moiety formed by $R_3$ and $R_4$ together with the carbon atoms $C_1$ and $C_{1'}$ to which each, respectively, is attached may be optionally substituted as defined above in embodiment (3) including the preferred subgroups thereof.

The amount of the compound of formula (I) used as a free radical generating compound (B) in the Polymer Composition is not critical and can vary depending on the desired crosslinking degree and the type of the crosslinkable polymer. As an example only, the amount of compound of formula (I) may be less than 15.0 wt %, less than 10.0 wt %, e.g. between 0.1 to 6.0 wt %, preferably from 0.25 to 5.0 wt %, based on the weight of the polymer composition. Factors affecting the amount of free radical generating compound (B) in the Polymer composition include the molecular weight of Compound of formula (I) and the desired degree of crosslinking.

The Polymer composition may contain one or more compounds (I) as said free radical generating compound.

Preparation of the Compounds of Formula (I)

Suitable compounds (I) usable in the invention may be e.g. commercially available. Alternatively, the compounds (I) can be prepared according to or analogously to known methods described in the chemical literature.

It is well known in the literature that compounds of the formula (I) can be synthesised using metal catalysed chemistry. One possible way is to couple a halogen containing unsaturation with an alkyne. This is often carried out in the presence of an organometallic catalyst, a base, and optionally a co-catalyst as outlined in Scheme 1. This general approach can be applied for both aromatic and unsaturated compounds of formula (I).

Scheme 1.

wherein Y is either a protective group, such as trimethyl silane, or $R_1$ as defined under formula (I) above, Z is an aromatic or vinylic hydrocarbyl moiety, and X is a halogen atom, such as chlorine, bromine or iodine.

One commonly used protocol for synthesising compounds of formula (I) is the known Sonogashira alkynylation reaction. In this reaction a halogen containing vinyl or aromatic moiety is reacted with a terminal alkyne as outlined in Scheme 2. This reaction is commonly catalysed by an organometallic palladium catalyst, cuprus iodine, and a base.

Scheme 2.

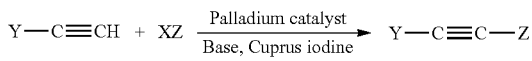

wherein Y is either a protective group, such as trimethyl silane, or $R_1$ as defined under formula (I) above, Z is an aromatic or vinylic hydrocarbyl moiety, and X is a halogen atom, such as chlorine, bromine or iodine.

Work up procedures are routine. A well known approach to terminal alkynes is to use a silane protective group, such as trimethylsilane, attached to the alkyne. This protective group can then be removed using a suitable reagent, such as tetrabutylammonium fluoride, to get the terminal alkyne.

Other synthetic methods which could produce compounds of formula (I) are also known in the literature, such as the Fritsch-Buttenberg-Wiechell rearrangement.

References to further usable synthetic methods are as follows:
1) Negishi A.; Anastasia L. *Chem. Rev.* 2003, 103, 1979-2017
2) Sahu B.; Namboothiri I. N. N.; Persky R. *Tetrahedron Let.* 2005, 46, 2593-2597
3) O'Connor J. M.; Friese S. J.; Tichenor M. *J. Am. Chem. Soc.* 2002, 124, 3506-3507
4) U.S. Pat. No. 5,618,900, including references cited on column 3 and 4 thereof.

The selection of a suitable synthesis route for each variant of Compounds (I) is within the skills of a skilled person.

Polymer (A) of the Polymer Composition

The polymer composition of the invention comprises a polymer (A).

The expression "Polymer Composition" is used herein to mean the polymer composition of the invention.

Any polymer can be used as the polymer (A) which can be modified, preferably crosslinked using the Compound (B). Such polymer can be typically a commercially available polymer or can be prepared according to or analogously to known polymerization process described in the chemical literature.

The polymer (A) preferably consists of one polymer which may contain one or more polymer components, i.e. can be unimodal or multimodal, e.g. bimodal, e.g with respect to molecular weight distribution (MWD) and/or comonomer distribution.

The polymer (A) is preferably a polyolefin (referred herein also as polyolefin (A)), which can be any polyolefin suitable for the production of an article, preferably a layer of a cable, preferably a layer of a power cable. Such polyolefin as the polymer (A) may optionally be unsaturated.

The polyolefin (A) of the Polymer Composition is preferably a polyethylene or polypropylene. Where herein it is referred to a "polymer", e.g. polyolefin, such as polyethylene, this is intended to mean both a homo- and copolymer, e.g. an ethylene homo- and copolymer. The polyolefin copolymer may contain one or more comonomer(s).

As well known "comonomer" refers to copolymerisable comonomer units. The comonomers are preferably selected from polar and non-polar comonomers or from mixtures thereof. The polar comonomer preferably contains hydroxyl group(s), alkoxy group(s), carbonyl group(s), carboxyl group(s), ether group(s) or ester group(s), or any mixture thereof. The non-polar comonomer is another comonomer than the polar comonomer and, preferably, is avoid (i.e. does not contain) hydroxyl group(s), alkoxy group(s), carbonyl group(s), carboxyl group(s), ether group(s) or ester group(s).

Where the polyolefin (A) is a polyethylene, the polymer may be produced in a high pressure process or in a low pressure process. The high pressure process is typically carried out by radical polymerization of ethylene in the presence of an initiator and optionally one or more comonomer(s). The low pressure process is typically carried out by polymerizing ethylene in the presence of a coordination catalyst system, for example a chromium, Ziegler-Natta or single-site catalyst system, and optionally one or more comonomer(s), which are preferably one or more non-polar comonomer(s) as defined above or below. Both processes, initiators and catalysts are well known and documented in the literature.

When the polyolefin (A) is a polypropylene, this may a propylene homo- or copolymer and/or a heterophasic polypropylene. Said different types of polypropylene and their preparation process, e.g. low pressure process, are well known and documented in the polymer literature.

Furthermore, where the polyolefin (A) is a polypropylene, it is preferred that it has an $MFR_2$ (230° C., 2.16 kg) of from 0.001 to 25 g/10 min.

In a preferred embodiment, the polyolefin (A) is an ethylene homo- or copolymer. The ethylene copolymer may comprise one or more comonomers, preferably one or more comonomer(s) selected from polar comonomer(s), non-polar comonomers(s) or a mixture of polar comonomer(s) and non-polar comonomer(s). The comonomers may be monounsaturated (contain one double bond) or polyunsaturated (contain two or more double bonds). In case of polyunsaturated comonomer(s) the polyolefin (A) is preferably an unsaturated ethylene copolymer. In the case of an ethylene copolymer as said polyolefin (A), it is preferred that it comprises comonomer(s) in a total amount of 0.001 to 50 wt.-%, more preferably of 0.1 to 40 wt.-%, more preferably less than 35 wt.-%, still more preferably of less than 30 wt.-%, more preferably less than 25 wt.-%, of one or more comonomers based on the amount of the polyolefin, depending on the desired end application of the Polymer Composition.

Preferably, the density of the ethylene homo or -copolymer as said polyolefin (A) is higher than 0.860 g/cm³. Furthermore, preferably the density of the ethylene homo or -copolymer as said polyolefin (A) is not higher than 0.960 g/cm³.

The $MFR_2$ (2.16 kg, 190° C.) of the ethylene homo or -copolymer as said polyolefin (A) is preferably from 0.01 to 50 g/10 min, more preferably is from 0.1 to 20 g/10 min, still more preferably is from 0.2 to 15 g/10 min, and most preferably is from 0.2 to 10 g/10 min.

Still further, it is preferred that the polyolefin (A) is a polyethylene, more preferably a polyethylene which has been produced in a high pressure (HP) process using free radical polymerization resulting in low density polyethylene (LDPE). The polymerization generally is performed at pressures of 100 to 400 MPa and at temperatures of 80 to 350° C. Such process are well known and well documented in the literature.

The LDPE as said polyolefin (A) may be a low density ethylene homopolymer (referred herein as LDPE homopolymer) or a copolymer of low density ethylene (referred herein as LDPE copolymer). The LDPE copolymer may contain one or more comonomers which are preferably selected from the polar comonomer(s), non-polar comonomer(s) or from a mixture of the polar comonomer(s) and non-polar comonomer(s), as defined above, or from a mixture thereof. Moreover, said LDPE homopolymer or LDPE copolymer as said polyolefin (A) may optionally be unsaturated.

As a polar comonomer for the LDPE copolymer suitable for the polyolefin (A), comonomer(s) containing hydroxyl group(s), alkoxy group(s), carbonyl group(s), carboxyl group(s), ether group(s) or ester group(s), or a mixture thereof, can used. More preferably, comonomer(s) containing carboxyl and/or ester group(s) are used as said polar comonomer. Still more preferably, the polar comonomer(s) of LDPE copolymer is selected from the groups of acrylate(s), methacrylate(s) or acetate(s), or any mixtures thereof. If present in said LDPE copolymer, the polar comonomer(s) is preferably selected from the group of alkyl acrylates, alkyl methacrylates or vinyl acetate, or a mixture thereof. Further preferably, said polar comonomers are selected from $C_1$- to $C_6$-alkyl acrylates, $C_1$- to $C_6$-alkyl methacrylates or vinyl acetate. Still more preferably, said polar LDPE copolymer is a copolymer of ethylene with $C_1$- to $C_4$-alkyl acrylate, such as methyl, ethyl, propyl or butyl acrylate, or vinyl acetate, or any mixture thereof.

As the non-polar comonomer(s) for the LDPE copolymer suitable for polyolefin (A), comonomers that are other than the above defined polar comonomers can be used. Preferably, the non-polar comonomers are other than comonomer(s) containing hydroxyl group(s), alkoxy group(s), carbonyl group(s), carboxyl group(s), ether group(s) or ester group(s). One group of preferable non-polar comonomers comprise, preferably consist of, monounsaturated (=one double bond) comonomer(s), preferably olefins, preferably alpha-olefins, more preferably $C_3$ to $C_{10}$ alpha-olefins, such as propylene, 1-butene, 1-hexene, 4-methyl-1-pentene, styrene, 1-octene, 1-nonene; polyunsaturated (=more than one double bond) comonomer(s), or any mixtures of monounsaturated and polyunsaturated comonomers. The polyunsaturated comonomers are further described below in relation to unsaturated LDPE copolymer.

If the LDPE is a copolymer, it is preferred that it includes 0.001 to 50 wt.-%, more preferably 0.1 to 40 wt.-%, still more preferably less than 35 wt.-%, still more preferably less than 30 wt.-%, more preferably less than 25 wt.-%, of one or more comonomers.

The polymer (A), preferably polyolefin (A), may optionally be an unsaturated polyolefin, i.e. a polyolefin comprising carbon-carbon double bonds. The "unsaturated" means herein that the polymer, preferably the unsaturated polyolefin, contains carbon-carbon double bonds/1000 carbon atoms in a total amount of at least 0.4/1000 carbon atoms. Then the polyolefin is preferably an unsaturated polyethylene, more preferably an unsaturated LDPE, even more preferably an unsaturated LDPE homopolymer or an unsaturated LDPE copolymer. In case of LDPE homopolymer the double bonds can be provided e.g. by polymerising ethylene in the presence of one or more chain transfer agents (CTAs), such as propylene, as known in the art. When polyunsaturated comonomer(s) are present in the LDPE polymer as said unsaturated polyolefin, then the LDPE is an unsaturated LDPE copolymer. In case of LDPE copolymer the double bonds can be provided e.g. by copolymerising ethylene with at least one polyunsaturated comonomer, optionally together with one or more other comonomer(s), and optionally in the presence of one or more chain transfer agents (CTAs), such as propylene.

The unsaturated comonomers suitable for the unsaturated polymer (A), preferably polyolefin (A), preferably consist of a straight carbon chain with at least 8 carbon atoms and at least 4 carbons between the non-conjugated double bonds, of which at least one is terminal, more preferably, said polyunsaturated comonomer is a diene, preferably a diene which comprises at least eight carbon atoms, the first carbon-carbon double bond being terminal and the second carbon-carbon double bond being non-conjugated to the first one. Preferred dienes are selected from $C_8$ to $C_{14}$ non-conjugated dienes or mixtures thereof, more preferably selected from 1,7-octadiene, 1,9-decadiene, 1,11-dodecadiene, 1,13-tetradecadiene, 7-methyl-1,6-octadiene, 9-methyl-1,8-decadiene, or mixtures thereof. Even more preferably, the diene is selected from 1,7-octadiene, 1,9-decadiene, 1,11-dodecadiene, 1,13-tetradecadiene, or any mixture thereof, however, without limiting to above dienes.

It is well known that e.g. propylene can be used as a comonomer or as a chain transfer agent (CTA), or both, whereby it can contribute to the total amount of the C—C double bonds, preferably to the total amount of the vinyl groups. Herein, when a compound which can also act as comonomer, such as propylene, is used as CTA for providing double bonds, then said copolymerisable comonomer is not calculated to the comonomer content.

The unsaturated polymer (A), preferably the unsaturated polyolefin (A), more preferably unsaturated polyethylene, has preferably a total amount of carbon-carbon double bonds/1000 carbon atoms of more than 0.4. The upper limit of the amount of carbon-carbon double bonds present in the polyolefin (A) is not limited and may preferably be less than 5.0/1000 carbon atoms, preferably less than 3.0/1000 carbon atoms.

The term "total amount of carbon-carbon double bonds" present in the unsaturated polymer (A), preferably polyolefin (A), refers preferably to those double bonds originating from vinyl groups, vinylidene groups and trans-vinylene groups. The amount of each type of double bond is measured as indicated in the experimental part. The total amount of vinyl groups is preferably higher than 0.05/1000 carbon atoms, still more preferably higher than 0.08/1000 carbon atoms, and most preferably higher than 0.11/1000 carbon atoms. Preferably, the total amount of vinyl groups is lower than 4.0/1000 carbon atoms.

The unsaturation can be provided to the Polymer Composition i.a. by means of the polymer(s) (A) and/or of a low molecular weight (Mw) compound(s), such as crosslinking booster or scorch retarder additives. In case both means are used, then the total amount of double bonds in the Polymer Composition is the sum of the double bonds present in the polymer(s) (A) and in the low Mw compound(s) and preferably varies in the ranges given above for the polymer (A).

Preparation Process of the Polymer Composition

The preparation process of the polymer composition is also provided wherein the polymer(s) (A) and at least one Compound (B) as defined above, preferably compound of formula (I), as the free radical generating compound (B), are mixed together. Preferably the Compound (B), preferably the Compound (I), is added to the polymer (A). The addition is typically effected by blending using e.g. any conventional mixing process and device. The addition can be made by e.g. mixing e.g. by meltmixing, the Compound (B), preferably the Compound (I), and optionally other components to the polymer (A) e.g. in an extruder. The formed melt of the resulting Polymer Composition is then pelletised in a conventional pelletising device. The obtained pellets can then be used for preparing an article comprising the Polymer Composition.

"Meltmixing" is well known blending method and means herein and below under article preparation process that the polymer component(s) are mixed in an elevated temperature, which is typically at least 20° C. above the melting or softening point of at least polymer component(s).

Alternatively, the Compound (B), preferably the Compound (I), can be added without meltmixing to the polymer (A), e.g. Compound (B) can be added in a liquid or solid state to the pre-made solid pellets of said polymer (A). In this alternative the Polymer composition may be e.g. in the following forms: 1) as pellets of polymer (A) wherein the Compound (B) is captured within and/or on the pellets of polymer (A) or 2) as a mixture which contains the pellets of polymer (A) and the Compound (B) as two separate components. Such Polymer Composition can be used for preparing an article.

Further alternatively, the Compound (B), preferably the Compound (I), can be added, optionally together with further component(s), to said polymer (A) during the preparation process of an article, preferably a cable, comprising the Polymer Composition.

End Uses and End Applications of the Invention

I. Modification Process

The invention provides a process for modifying the Polymer Composition. The modification process includes crosslinking the polymer (A), vis-breaking for modifying the molecular weight of the polymer (A) and grafting e.g. functional groups to the polymer (A) using the Compound (B), preferably the Compound (I).

The modification of the polymer is typically achieved by heating the Polymer Composition at a temperature effective to cause the modification, preferably the crosslinking, and which causes the Compound (B) to generate radicals which react further with said polymer (A). The optimisation of the crosslinking temperature is within the skills of a skilled person.

Without binding to any theory the Compounds (B), preferably the Compounds (I), generate diradicals via cyclization. This is known in the literature as a Bergman cyclization, which in general terms is a thermally driven cyclization of a Z-1,5-diyne-3-ene into a 1,4-didehydrobenzene diradical. The formed diradical is, if suitable H-donors are available, transformed into the corresponding benzene, benzene substituted, or benzene annulated product (Scheme 3).

Scheme 3. The Bergman cyclization

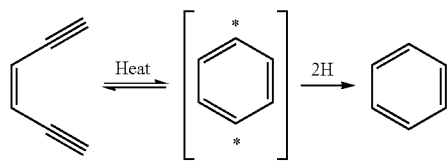

As general references to the Bergman cyclization reaction the following literature can be mentioned:
1) Grissom J. W.; Calkins T. L.; McMillen H. A.; Jiang Y. *J. Org. Chem.* 1994, 59, 5833-5835
2) Rawat D. S.; Zaleski J. M. *Synlett* 2004, 3, 393-421

Surprisingly the polymer (A) as defined above can act i.a. as suitable H-donor to enable a modification, preferably crosslinking, to occur in conditions wherein the polymer is not destroyed. More surprisingly also the polymer (A) can be modified, preferably crosslinked, with said Compound (B) after processing the polymer (A) to an article.

The temperature raise during the modification thus accelerates the reaction. The half-life, $t_{1/2}$, at which the half of the amount of the Compound (B) as defined above is transformed to a diradical and cyclized and/or also the diradical generation/cyclization temperature can vary depending on the molecule structure of Compound (B), preferably of the Compound (I). Accordingly, the temperature at which the diradical is formed from a Compound (B) can be tailored and designed within the scope of the Compound (B), preferably the Compound (I), to have a desired modification temperature suitable for different polymer(s) (A) and/or for different end applications of the invention.

FIG. 1. Examples of aromatic ene-diynes with different half-times for the Bergman cyclization process.

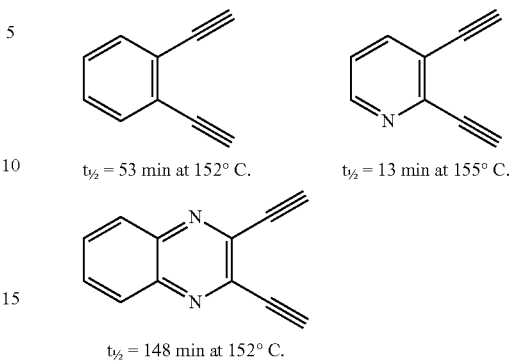

$t_{1/2}$ = 53 min at 152° C.     $t_{1/2}$ = 13 min at 155° C.

$t_{1/2}$ = 148 min at 152° C.

Preferred modification process is a process for crosslinking the polymer composition using a Compound (B) which is preferably a compound of formula (I) of the invention as defined above.

The term "crosslinking" is well known and commonly used in the polymer field and means forming, primarily, of interpolymer crosslinks (bridges) via radical reaction.

II. Article

The new principle of the invention is highly feasible in wide variety of end applications of polymers.

Accordingly, the invention further provides an article comprising the polymer composition of the invention comprising a polymer (A) and a Compound (B), preferably a compound of formula (I), as defined above or below in claims.

Moreover, the invention provides a process for producing the above defined article, which comprises the steps of a) forming an article by using the Polymer Composition.

The invention is highly suitable for W&C applications, whereby the article is a cable which is crosslinkable and comprises a conductor surrounded by one or more layers, wherein at least one layer comprises the Polymer Composition comprising a polymer (A) and a Compound (B), preferably a compound of formula (I), as defined above or below in claims.

In one preferable embodiment said article of the invention is a cable which comprises a conductor surrounded with one or more layers, wherein at least one layer comprises said polymer composition of the invention or a modified polymer composition of the invention.

The term "conductor" means herein above and below that the conductor comprises one or more wires. Moreover, the cable may comprise one or more such conductors. Preferably the conductor is an electrical conductor.

Further preferably the cable of the invention is a power cable which comprises at least an inner semiconductive layer, an insulation layer and an outer semiconductive layer and optionally a jacketing layer, in the given order, wherein at least the insulation layer comprises the Polymer Composition.

The power cable means herein a cable that transfers energy operating at any voltage and includes (LV), (MV), (HV) or (EHV) cable applications. The voltage applied to the power cable can be alternating (AC), direct (DC), or transient (impulse). In a preferred embodiment, the multi-layered article is a power cable operating at voltages higher than 1 kV.

The preferred process for producing an article is a process for producing a cable, which comprises a conductor surrounded by one or more layers, wherein the process comprises a step of a) applying the Polymer Composition on a conductor to form at least one of said one or more cable layers.

Preferably, the Polymer Composition is meltmixed optionally together with further component(s), such as additive(s), and a) the obtained melt is applied on the conductor.

Preferably, the layer(s) are a) applied by (co)extrusion. The term "(co)extrusion" means herein that in case of two or more layers, said layers can be extruded in separate steps, or at least two or all of said layers can be coextruded in a same extrusion step, as well known in the art.

The preferred embodiment of the process provides the preparation of a crosslinkable article, preferably a crosslinkable cable, more preferably a crosslinkable power cable, which process comprises a further step of b) modifying, preferably crosslinking, the article, preferably at least one layer of the cable, obtained from step a) as defined above comprising the Polymer Composition, wherein the modification, preferably crosslinking, is effected by free radical reaction using (B) a free radical generating agent which is the diradical generating compound, preferably the ene-diyne, more preferably the compound of formula (I), as defined above or in claims.

It is understood and well known that also the other cable layers and materials thereof, if present, can be crosslinked at the same time, if desired.

Crosslinking is effected by contacting the Compound (B), preferably Compound (I), with the polymer (A) at a temperature sufficient to initiate and carry out the crosslinking of the polymer (A), wherein said Compound (B), preferably Compound (I), contains sites of C—C unsaturation which cyclize to form a diradical. Typically the crosslinking is effected at increased temperature, e.g. at a temperature above 140° C., more preferably above 150° C., such as within the range of 160 to 350° C., depending on the used crosslinking Compound(s) (B) as well known in the field. For example the crosslinking temperature may be at least 20° C. higher than the temperature used in meltmixing step for preparing the article, preferably the cable, and can be estimated by a skilled person.

As a result a modified, preferably crosslinked, article is obtained, preferably a modified, preferably crosslinked, cable comprising at least one crosslinked layer of the Polymer Composition of the invention is obtained.

Determination Methods

Unless otherwise stated the below determination methods were used to determine the properties defined generally in the description part and claims and in the experimental part.

Melt Flow Rate

The melt flow rate (MFR) is determined according to ISO 1133 and is indicated in g/10 min. The MFR is an indication of the flowability, and hence the processability, of the polymer. The higher the melt flow rate, the lower the viscosity of the polymer. The MFR is determined at 190° C. for polyethylenes and may be determined at different loadings such as 2.16 kg (MFR$_2$) or 21.6 kg (MFR$_{21}$). The MFR is determined at 230° C. for polypropylenes.

Density

The density was measured according to ISO 1183D. The sample preparation was executed according to ISO 1872-2.

Gel Content

Gel content is measured according to ASTM D 2765-01, Method A, using decaline extraction and with the modifications specified below. The samples for method A were prepared:

Preparation of Samples, Impregnation

The test polyethylene pellets were ground to a fine powder in a Retsch grinder with a 1.5 mm sieve. The powder obtained was impregnated with the test ene-diyne dissolved in a pentane solution until the pentane had evaporated to give a dry powder of the test ene-diyne and the test polymer. The content of the test composition was 5 parts test ene-diyne and 100 parts test polymer.

Preparation of Samples, Crosslinking

The crosslinking of test polymers was conducted in a Specac press, where the composition was kept at 190° C. for 20 min at 5 bar followed by cooling to ambient temperature over 30 min at 5 bar. The obtained pressed test plaques had the following dimensions. The plaques were 100 mm long, 100 mm wide, and 0.1 mm thick when used for determination of the gel content as described below.

The obtained crosslinked plaques were then cut into 20 mm×20 mm×2 mm pieces and microtomed into 200 μm×2 mm stripes. The 0.3±0.015 g of the stripes were then used in the procedure as described in ASTM D 2765-01, Method A, with the following two deviations from this standard:

1) An addition extraction for 1 hour with new decaline was done in order to secure that all solubles were extracted.
2) Only 0.05% antioxidant (Irganox 1076) was added to the decalin instead of 1% as specified in the standard.

The gel content was then calculated according to said ASTM D 2765-01.

Amount of Double Bonds in the Polymer Composition or in the Unsaturated Polymer

The below methods can be used for determining the amount of carbon-carbon double bonds present in an unsaturated polymer component or in an unsaturated polymer composition, as desired, and both are shortly referred below as polymer. The methods 1a-1c, unless otherwise stated, are based upon the standard methods ASTM D3124-98 and ASTM D6248-98, wherein ASTM D3124-98 describes the determination of vinylidene groups/1000 C based upon 2,3-dimethyl-1,3-butadiene, ASTM D6248-98 describes the determination of vinyl groups/1000 C based on 1-octene and of trans-vinylene groups/1000 C based on trans-3-hexene.

1a. The Total Amount of Carbon-Carbon Double Bonds Present in Polymer

For the determination of the extinction coefficient (=molar absorptivity) for these three types of double bonds, the following three compounds have been used: 1-decene for vinyl, 2-methyl-1-heptene for vinylidene and trans-4-decene for trans-vinylene, and the procedure as described in ASTM D3124-98 (section 10) and ASTM D6248-98 (section 10) was followed, except that peak height was used for the calculation instead of integrated peak area.

The total amount of double bonds was analysed by means of IR spectrometry and given as the amount of vinyl bonds, vinylidene bonds and trans-vinylene bonds per 1000 carbon atoms.

A base line was drawn from 980 cm$^{-1}$ to around 840 cm$^{-1}$ in the absorbance spectrum. The peak heights were determined at around 888 cm$^{-1}$ for vinylidene, around 910 cm$^{-1}$ for vinyl and around 965 cm$^{-1}$ for trans-vinylene.

$$B=[1/(C\times L)]\times A$$

where C=concentration of the carbon-carbon double bond to be measured (mol/l); L=cell thickness (mm); A=maximum absorbance (in our case the peak height) of the peak of the type of carbon-carbon double bond to be measured (mol/l).

The amount of carbon-carbon double bonds is determined from a film sample consisting of the polymer. The film samples are 0.5-1 mm thick and are prepared by compression moulding. The films are analysed with FT-IR and scanned with a resolution of 4 cm$^{-1}$. The total amount of carbon double bonds expressed as "number/1000 C" is calculated from the following equations:

$$\text{Vinyldiene}/1000C=(A\times14)/18.24\times L\times D)$$

where the molar absorptivitiy B is 18.24 calculated from the analyses of the solutions containing 2-methyl-1-heptene.

$$\text{Vinyl}/1000C=(A\times14)/13.13\times L\times D)$$

where the molar absorptivitiy B is 13.13 calculated from the analyses of the solutions containing 1-decene.

$$\text{Trans-vinylene}/1000C=(A\times14)/(15.14\times L\times D)$$

where the molar absorptivitiy B is 15.14 calculated from the analyses of the solutions containing trans-4-decene.
A=absorbance (here peak height), L=film thickness (mm), D=density of the material (g/cm$^3$).

1b Determination of the Number of Vinyl Groups Originating from the Polyunsaturated Comonomer Per 1000 C Present in a Polymer The amount of vinyl groups originating from the polyunsaturated comonomer per 1000 C was determined for vinyl, vinylidene and trans-vinylene groups.

For this determination there is a need to have a sample of the polymer to be analysed (i.e. the polymer that has been polymerised in the presence of a polyunsaturated comonomer) and to have a sample of a reference polymer. This reference polymer needs then to be polymerised under as similar conditions as the polymer to be analysed (i.e. the one containing the polyunsaturated comonomer) for example the same type of reactor set up, as similar temperature settings, pressure, production rate, monomer feed, type and amount of CTA, if used, etc, but with the only difference that the polyunsaturated comonomer is not added. Then the number of vinyl groups is determined from the polymer to be analysed as well as from the reference polymer according to the procedure 1a above. The number of vinyl groups analysed in the polymer includes vinyls that are created by the process and vinyls which are incorporated to the polymer by copolymerisation of polyunsaturated comonomer. The number of vinyl groups analysed in the reference polymer includes only the vinyl groups created by the process under the selected polymerisation conditions. Then the amount of vinyl groups originating from the polyunsaturated comonomer can be determined as:

Total number of vinyl groups in the polymer to be analysed subtracted by the total number of vinyl groups in the reference polymer.

1c Calibration Procedure for Measuring the Double Bond Content of any Unsaturated Low Molecular Weight Compound, if Present (Referred Below as Compound)

The molar absorptivity for Compound (e.g. a crosslinking booster or a scorch retardant compound as exemplified in the description part) can be determined according to ASTM D3124-98 and ASTM D6248-98. At least three solutions of the Compound in CS$_2$ (carbon disulfide) are prepared. The used concentrations of the solutions are close to 0.18 mol/l. The solutions are analysed with FTIR and scanned with resolution 4 cm$^{-1}$ in a liquid cell with path length 0.1 mm. The maximum intensity of the absorbance peak that relates to the unsaturated moiety of the Compound(s) (each type of carbon-carbon double bonds present) is measured.

The molar absorptivity, B, in liters/mol×mm for each solution and type of double bond is calculated using the following equation:

$$B=(1/CL)\times A$$

C=concentration of each type of carbon-carbon double bond to be measured, mol/l

L=cell thickness, mm

A=maximum absorbance (peak height) of the peak of each type of carbon-carbon double bond to be measured, mol/l.

The average of the molar absorptivity, B, for each type of double bond is calculated.

The average molar absorptivity, B, of each type of carbon-carbon double bond can then be used for the calculation of the concentration of double bonds in the reference polymer and the polymer samples to be analysed.

Comonomer Content of Polar Comonomers

1. Polymers Containing >6 Wt. % Polar Comonomer Units

Comonomer content (wt %) was determined in a known manner based on Fourier transform infrared spectroscopy (FTIR) determination calibrated with quantitative nuclear magnetic resonance (NMR) spectroscopy. For the FTIR measurement a film of 0.5-0.7 mm thickness was prepared. After the analysis with FTIR, base lines in absorbance mode were drawn for the two peaks to be analysed. The absorbance peak for the comonomer was normalised with the absorbance peak of polyethylene (e.g. the peak height for butyl acrylate or ethylacrylate at 3450 cm−1 was divided with the peak height of polyethylene at 2020 cm−1). The NMR spectroscopy calibration procedure was undertaken in the conventional manner which is well documented in the literature. The weight-% can be converted to mol-% by calculation. It is well documented in the literature.

For the determination of the content of methylacrylate a 0.10 mm thick film sample was prepared. After the analysis the maximum absorbance for the peak for the methylacrylate at 3455 cm−1 was subtracted with the absorbance value for the base line at 2475 cm−1 (Amethylacrylate-A2475). Then the maximum absorbance peak for the polyethylene peak at 2660 cm−1 was subtracted with the absorbance value for the base line at 2475 cm−1 (A2660-2475). The ratio between (Amethylacrylate-A2475) and (A2660-A2475) was then calculated.

2. Polymers Containing 6 Wt. % or Less Comonomer Units

Comonomer content (wt. %) was determined in a known manner based on Fourier transform infrared spectroscopy (FTIR) determination calibrated with quantitative nuclear magnetic resonance (NMR) spectroscopy. For the FT-IR measurement a film of 0.05 to 0.12 mm thickness was prepared. After the analysis the maximum absorbance for the peak for the comonomer (for methylacrylate at 1164 cm−1 and butylacrylate at 1165 cm−1) was subtracted with the absorbance value for the base line at 1850 cm−1 (Acomonomer-A1850). Then the maximum absorbance peak for polyethylene peak at 2660 cm−1 was subtracted with the absorbance value for the base line at 1850 cm−1 (A2660-A1850). The ratio between (Acomonomer-A1850) and (A2660-A1850) was then calculated. The NMR spectroscopy calibration procedure was undertaken in the conventional manner which is well documented in the literature. The weight-% can be converted to mol-% by calculation. Is it well documented in the literature.

EXPERIMENTAL PART

Examples

Example 1

Preparation of 1,2-diethynylbenzene

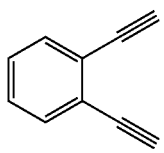

(Ia)

1,2-diethynylbenzene can be produced according to known literature procedures, such as reported in the article; "Sahu B., Namboothiri I. N. N., Persky R. *Tetrahedron Lett.* 2005, 46, 2593-2597"

Example 2

Preparation of 4-tert-butyl-1,2-diethynylbenzene

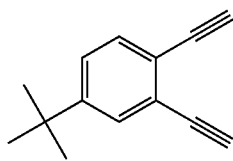

(Ib)

4-tert-butyl-1,2-diethynylbenzene is novel as is and can be prepared according to the following synthetic route;

A. (4-tert-butyl-1,2-phenylene)bis(ethyne-2,1-diyl)bis(trimethylsilane)

4-tert-butyl-1,2-dibromobenzene (5.0 g, 17 mmol), copper iodide (0.17 g, 0.9 mmol), tetrakis(triphenylphosphine)palladium (1.04 g, 0.9 mmol), ethynyltrimethylsilane (4.2 g, 43 mmol), and triethylamine (25 ml) were heated to 20° C. and stirred for 4 hours. The reaction mixture was then heated to 80° C. for 44 hours. Additional ethynyltrimethylsilane (2.5 g, 25 mmol) was added and the reaction mixture was stirred at 47° C. for 60 hours. Column chromatography (silica) was performed to remove metals and salts, using heptane as eluent. The crude product mixture was used without further purification.

B. 4-tert-butyl-1,2-diethynylbenzene

Sodium hydroxide (1N) was added to the crude (4-tert-butyl-1,2-phenylene)bis(ethyne-2,1-diyl)bis(trimethylsilane) in methanol to remove the trimethylsilane groups. Stirring for 30 minutes resulted in the crude final product mixture. Column chromatography using heptane:ethyl acetate (99:1) as eluent provided the desired compound, 4-tert-butyl-1,2-diethynylbenzene, as a brown oil (1.08 g, 5.9 mmol). $^1$H-NMR (CDCl$_3$) δ 1.30 (s, 9H) 3.28 (s, 1H) 3.30 (s, 1H) 7.33 (d, 1H) 7.43 (d, 1H) 7.51 (d, 1H)

Crosslinking Test

Materials

Compounds Ia and Ib of the above examples were tested for their crosslinking efficacy. As the polymer to be crosslinked, pellets of the following test polyethylene polymers were used for the test:

PE: a conventional low density polyethylene (LDPE) homopolymer produced via a free radical polymerisation in high pressure tubular reactor. The MFR2=2 g/10 min and the density is 922 kg/m3.

EBA: a conventional LDPE copolymer, poly(ethylene-co-butylacrylate) polymer (EBA) produced via a free radical polymerisation in high pressure tubular reactor and having a butylacrylate (BA) content of 23 wt % and a MFR2=4 g/10 min.

Gel Content Results

The gel content of the test polymer prepared as described above was determined according to the method above and the results are shown below (Table 1.)

TABLE 1

| | Gel content | | |
| Example | Test ene-diyne | Polymer | Gel content (%) |
|---|---|---|---|
| 1 | Ia | PE | 66 |
| 2 | Ia | EBA | 76 |
| 3 | Ib | EBA | 56 |

Preparation Example of the Crosslinked Cable of the Invention:

A power cable comprising an inner semiconductive layer, an insulation layer and an outer semiconductive layer for experimental testing is prepared in a commercial pilot scale extruder by coextruding the layer materials, in given order, on a conductor using a conventional extruder line and conventional extrusion conditions.

Two power cables are prepared. The above specified polymer compositions of Examples 1, 2 and 3 are used as layer materials for both cables as follows:

The first cable: Both the inner and outer semiconductive layers comprise EBA as defined above, 40 wt % of furnace black (carbon black), an antioxidant and test ene-diyne Ia as the crosslinking agent. The insulation layer comprises PE as defined above, an antioxidant and test ene-diyne Ia as the crosslinking agent.

The second cable: Both the inner and outer semiconductive layers comprise EBA as defined above, 40 wt % of furnace black (carbon black), an antioxidant and test ene-diyne Ib as the crosslinking agent. The insulation layer comprises PE as defined above, an antioxidant and test ene-diyne Ib as the crosslinking agent.

After extrusion the obtained cables are immediately subjected to a conventional vulcanisation tube and crosslinked in a known manner by heating in well known crosslinking conditions. After crosslinking the cable is then cooled in cooling zone of said vulcanisation tube.

The crosslinking level is sufficient to provide good mechanical properties that are advantageous to the crosslinked cables.

What is claimed is:

1. A polymer composition comprising:
   A) an unsaturated low density polyethylene (LDPE) homopolymer, an LDPE copolymer with one or more unsaturated comonomer(s), or an LDPE copolymer with one or more polar comonomer(s); and
   B) less than 15 wt % of a cross-linking agent, based on a weight of the polymer composition, wherein said crosslinking agent consists of a free radical generating compound, which is a diradical generating compound which contains sites of C—C unsaturation which cyclise to form a diradical and which is a cis-ene-diyne compound of formula (I):

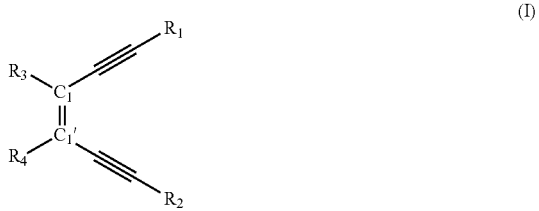

wherein
- $R_1$ and $R_2$ are each independently H, substituted or unsubstituted saturated or partially unsaturated hydrocarbyl group which optionally contains one or more heteroatom(s); or a substituted or unsubstituted aromatic hydrocarbyl group which optionally contains one or more heteroatom(s); or $R_1$ and $R_2$ form together a divalent substituted or unsubstituted saturated or partially unsaturated hydrocarbyl group which optionally contains 1 to 4 heteroatoms, wherein $R_1$ is linked to $C_1$ and $R_2$ to $C_{1'}$, respectively, forming together with $C_1=C_{1'}$ a substituted or unsubstituted partially unsaturated cyclic hydrocarbyl or a substituted or unsubstituted aromatic hydrocarbyl ring moiety of 6 to 14 C-atoms:
- $R_3$ and $R_4$ are each independently H, substituted or unsubstituted saturated or partially unsaturated hydrocarbyl group which optionally contains one or more heteroatom(s), a substituted or unsubstituted aromatic hydrocarbyl group which optionally contains one or more heteroatom(s); or $R_3$ and $R_4$ together with the carbon atoms $C_1$ and $C_{1'}$ to which each, respectively, is attached form an unsubstituted or substituted partially unsaturated cyclic hydrocarbyl moiety which has carbon atoms and optionally from 1 to 4 heteroatom(s) as ring-atoms; or $R_3$ and $R_4$ together with the carbon atoms $C_1$ and $C_{1'}$ to which each, respectively, is attached form an unsubstituted or substituted cyclic aromatic hydrocarbyl moiety which has carbon atoms as ring-atoms and optionally from 1 to 4 heteroatom(s) as ring-atoms;

wherein the polymer composition has a crosslinkability expressed as a gel content of at least 56% when measured from a sample of the crosslinked polymer composition (ASTM D 2765-01, Method A, decaline extraction) when cross-linked only by the diradical generating compound.

2. The polymer composition according to claim 1, wherein a subgroup of compounds of (I) the substituted or unsubstituted saturated or partially unsaturated hydrocarbyl group as said $R_1$, $R_2$, $R_3$ or $R_4$ is independently selected from:
   (i) an optionally substituted straight or branched chain saturated or partially unsaturated hydrocarbyl group,
   (ii) an optionally substituted straight or branched chain saturated or partially unsaturated hydrocarbyl group which bears a saturated or partially unsaturated cyclic hydrocarbyl moiety or an optionally substituted straight or branched chain saturated or partially unsaturated hydrocarbyl group which bears an aromatic hydrocarbyl moiety, or
   (iii) an optionally substituted saturated or partially unsaturated cyclic hydrocarbyl group.

3. The polymer composition according to claim 1, where in a subgroup of compounds of (I) the optional substituent(s) are present in any of the groups as $R_1$, $R_2$, $R_3$ or $R_4$ or present in any of the cyclic ring moiety formed together by substituents $R_3$ and $R_4$ or, respectively, together by substituents $R_1$ and $R_2$, then each optional substituent is independently selected from a functional group; a saturated or partially unsaturated hydrocarbyl group optionally bearing a functional group; or an aromatic hydrocarbyl group optionally bearing a functional group.

4. The polymer composition according to claim 1, wherein $R_1$ and $R_2$ are both H and $R_3$ and $R_4$ of compounds of formula (I) are both independently other than H.

5. The polymer composition according to claim 3, wherein (B) the free radical generating compound is selected from the group consisting of:
   1) a first subgroup of compounds of formula (I), wherein
      $R_1$, $R_2$, $R_3$ and $R_4$ are each independently selected from H or unsubstituted or substituted straight or branched chain hydrocarbyl groups, wherein each of said straight or branched chain may optionally contain one or more heteroatom;
      and wherein the amount of optional substituent(s), if present in any of the groups $R_1$, $R_2$, $R_3$ or $R_4$, is from 1 to 4, and each optional substituent is independently selected from a functional group or from straight or branched chain (C1-C30)alkyl group optionally comprising a functional group as defined in claim 3;
      in this subgroup of compounds of formula (I) $R_1$, $R_2$, $R_3$ and $R_4$ are each independently selected from H or an unsubstituted or substituted straight chain hydrocarbyl group, or from any straight chain subgroup thereof as defined above; or
   2) a second subgroup of compounds of formula (I), wherein
      $R_1$ and $R_2$, are each independently selected from H or unsubstituted or substituted straight or branched chain hydrocarbyl groups, wherein each of said straight or branched chain may optionally contain one or more heteroatom,
      $R_3$ and $R_4$ together with the carbon atoms $C_1$ and $C_{1'}$ to which each, respectively, is attached form an unsubstituted or substituted partially unsaturated cyclic hydrocarbyl moiety having carbon atoms and optionally from 1 to 4 heteroatom(s) as ring-atoms, wherein the optional heteroatoms are selected independently from atoms different from C and H, from Si, N, P, O or S;
      and wherein the amount of optional substituent(s), if present in any of the groups $R_1$, $R_2$, $R_3$ or $R_4$, is from 1 to 4, and each optional substituent is independently selected from a functional group or from straight or branched chain (C1-C30)alkyl group optionally comprising a functional group as defined in claim 3;
      in this subgroup of compounds of formula (I) the unsubstituted or substituted cyclic hydrocarbyl moiety formed by $R_3$ and $R_4$ is an optionally substituted mono or multicyclic moiety and contains 5-12 ring-atoms; or
   3) a third subgroup of compounds of formula (I), wherein
      $R_1$ and $R_2$, are each independently selected from H or unsubstituted or substituted straight or branched chain hydrocarbyl groups, wherein each of said straight or branched chain may optionally contain one or more heteroatom, R₃ and R₄ together with the carbon atoms $C_1$ and $C_{1'}$ to which each, respectively, is attached form an unsubstituted or substituted cyclic aromatic hydrocarbyl moiety having carbon atoms and optionally from 1 to 4 heteroatom(s) as ring-atoms, wherein the optional heteroatoms are selected independently from atoms different from C and H;

and wherein the amount of optional substituent(s), if present in any of the groups $R_1$, $R_2$, $R_3$ or $R_4$, is from 1 to 4, and each optional substituent is independently selected from a functional group or from straight or branched chain (C1-C30)alkyl group optionally comprising a functional group as defined in claim 2;

in this subgroup of compounds of formula (I) the cyclic aromatic hydrocarbyl moiety formed by $R_3$ and $R_4$ is an optionally substituted mono or multicyclic moiety.

6. The polymer composition according to claim 5, wherein (B) the free radical generating compound is selected from 3) a subgroup (embodiment (3)) of compounds of formula (I).

7. A polymer composition as defined in claim 1 which is in a form of (1) polymer powder, (2) polymer pellets or (3) a melt mixture comprising the polymer composition.

8. An article comprising the polymer composition according to claim 1, wherein the article comprises a crosslinkable cable which comprises a conductor which is surrounded by one or more layers, wherein at least one of said one or more layer(s) comprises the polymer composition.

9. The article according to claim 8, which is a crosslinkable cable selected from any of the following cables:
a low voltage cable comprising a conductor surrounded by an insulation layer and optionally a jacketing layer, wherein at least said insulation layer comprises the polymer composition; or
a power cable comprising an electrical conductor surrounded by one or more layers comprising at least an inner semiconductive layer, insulation layer, an outer semiconductive layer and optionally a jacketing layer, in that order, wherein at least one of said layers comprises the polymer composition.

10. A process for producing a crosslinkable cable comprising a step of applying one or more layers comprising a polymer composition on a conductor, wherein at least one of said one or more layer(s) is applied using a polymer composition according to claim 1.

11. A method for modifying and/or for crosslinking, (A) the unsaturated LDPE homopolymer, the LDPE copolymer with one or more unsaturated comonomer(s), or the LDPE copolymer with one or more polar comonomer(s) of the polymer composition according to claim 1 comprising initiating a radical reaction using (B) the cross-linking agent, whereby the radical reaction avoids formation of gaseous decomposition products.

12. A method for crosslinking the article as defined in claim 8 comprising initiating a radical reaction using (B) the cross-linking agent, wherein at least one of said one or more layer(s) comprises the polymer composition and the radical reaction avoids formation of gaseous decomposition products.

13. A crosslinked article comprising a cable, obtained by the method of claim 12.

14. The polymer composition according to claim 3 wherein the subgroup of compounds of (I) comprises 1-4 optional substituent(s).

15. The polymer composition according to claim 3 wherein the functional group is selected from the group consisting of —OH; —NR₂, wherein each R is independently —H or (C1-C12)alkyl-; —COR", wherein R" is —H, (C1-C12)alkyl- or —NR₂, wherein each R is as defined for —NR₂; —COOR", wherein R" is as defined for —COR"; halogen; alkoxy-; nitro-; thiol-; -thioC₁₋₁₂alkyl and —CN.

16. The polymer composition according to claim 15 wherein said halogen is selected from the group consisting of —F, —Cl, Br and —I.

17. The polymer composition according to claim 15 wherein said alkoxy is —OC₁₋₁₂alkyl.

18. The polymer composition according to claim 3 wherein said optional substituent is selected from the group consisting of (C1-30)hydrocarbyl group optionally comprising 1 to 3 substituent(s) selected independently from a functional group.

19. The polymer composition according to claim 3 wherein said optional substituent is selected from the group consisting of (C1-12)hydrocarbyl group which can be straight or branched chain or cyclic (C1-12)hydrocarbyl group optionally comprising 1 to 3 substituent(s) selected independently from a functional group.

20. The polymer composition according to claim 5, wherein in the first, second and third subgroups said unsubstituted or substituted straight or branched chain hydrocarbyl groups comprise optionally substituted straight or branched chain (C1-C50)alkyl groups, optionally substituted straight or branched chain (C2-C50)alkenyl groups or optionally substituted straight or branched chain (C2-C30)alkynyl groups.

21. The polymer composition according to claim 5, wherein in the first, second and third subgroups said unsubstituted or substituted straight or branched chain hydrocarbyl groups comprise methyl, ethyl, propyl, butyl, pentyl, hexyl, heptyl, octyl, decyl, undecyl or dodecyl groups.

22. The polymer composition according to claim 5, wherein in the first, second and third subgroups said heteroatom is selected from the group consisting of N, O, P, and S.

23. The polymer composition according to claim 5, wherein in the first, second and third subgroups said unsubstituted or substituted straight or branched chain hydrocarbyl groups comprise (C1-C6)alkyl-O—(C1-C6)alkyl group.

24. The polymer composition according to claim 5, wherein in the first, second and third subgroups said each optional substituent is independently selected from a straight or branched chain (C1-C6)alkyl group which optionally comprises a functional group, said functional group being selected from the group consisting of —OH; —NR₂, wherein each R is independently —H or (C1-C12)alkyl-; —COR", wherein R" is —H, (C1-C12)alkyl- or —NR₂, wherein each R is as defined for —NR₂; —COOR", wherein R" is as defined for —COR"; halogen; alkoxy-; nitro-; thiol-; -thioC₁₋₁₂alkyl and —CN.

25. The polymer composition according to claim 5, wherein in the first subgroup the compounds of formula (I) R1 and R2 are identical groups and R3 and R4 are identical groups; or R1 and R2 are both H and R3 and R4 are both unsubstituted or substituted hydrocarbyl groups as defined above in claim 5.

26. The polymer composition according to claim 5, wherein in the second subgroup $R_3$ and $R_4$ together with the carbon atoms $C_1$ and $C_{1'}$ to which each, respectively, is attached form an unsubstituted or substituted partially unsaturated cyclic hydrocarbyl moiety having 5 or 6 ring atoms which are carbon atoms.

27. The polymer composition according to claim 5, wherein in the second subgroup $R_3$ and $R_4$ together with the carbon atoms $C_1$ and $C_{1'}$ to which each, respectively, is attached comprise an unsubstituted or substituted partially unsaturated cyclic hydrocarbyl moiety having 5 or 6 ring-atoms which are carbon atoms, and having one unsaturation which is the double bond between $C_1$ and $C_{1'}$.

28. The polymer composition according to claim 5, wherein in the second subgroup $R_3$ and $R_4$ together with the carbon atoms $C_1$ and $C_{1'}$ comprise an optionally substituted cyclopentene or cyclohexene moiety.

29. The polymer composition according to claim 5, wherein in the second subgroup $R_1$ and $R_2$ are independently H or an optionally substituted straight chain hydrocarbyl group; $R_1$ and $R_2$ are identical groups; or both $R_1$ and $R_2$ are H.

30. The polymer composition according to claim 5, wherein in the third subgroup the cyclic aromatic hydrocarbyl moiety formed by $R_3$ and $R_4$ comprise an optionally substituted phenyl or pyridyl moiety.

31. The polymer composition according to claim 5, wherein in the third subgroup $R_1$ and $R_2$ are independently H or an optionally substituted straight chain hydrocarbyl group; $R_1$ and $R_2$ are identical groups; or both $R_1$ and $R_2$ are H.

32. The composition according to claim 1 wherein the unsaturated LDPE homopolymer, the LDPE copolymer with one or more unsaturated comonomer(s), or the LDPE copolymer with one or more polar comonomer(s) has been produced in a high pressure process using free radical polymerization of polyethylene, resulting in the LDPE which is unsaturated, or copolymerized with one or more unsaturated comonomer(s) or one or more polar comonomer(s).

33. The polymer composition according to claim 7 wherein the polymer composition is in the form of (2) polymer pellets comprising (A) the unsaturated LDPE homopolymer, the LDPE copolymer with one or more unsaturated comonomer(s), or the LDPE copolymer with one or more polar comonomer(s) and (B) the free radical generating compound.

34. A crosslinkable power cable which comprises a conductor which is surrounded by at least an inner semiconductive layer, an insulation layer, and an outer semiconductive layer, wherein at least the insulation layer comprises a polymer composition, wherein said polymer composition comprises:
  A) an unsaturated low density polyethylene (LDPE) homopolymer, an LDPE copolymer with one or more unsaturated comonomer(s), or an LDPE copolymer with one or more polar comonomer(s), and
  B) less than 15 wt % of a cross-linking agent, based on a weight of the polymer composition, wherein said cross-linking agent consists of a free radical generating compound, which is a diradical generating compound which contains sites of C—C unsaturation which cyclise to form a diradical and which is a cis-ene-diyne compound of formula (I):

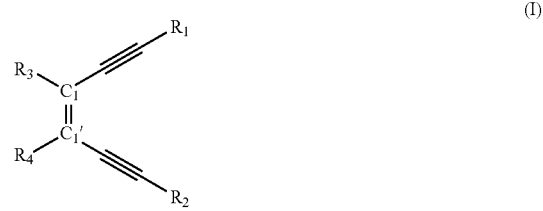

wherein
  $R_1$ and $R_2$ are each independently H, substituted or unsubstituted saturated or partially unsaturated hydrocarbyl group which optionally contains one or more heteroatom(s); or a substituted or unsubstituted aromatic hydrocarbyl group which optionally contains one or more heteroatom(s); or $R_1$ and $R_2$ form together a divalent substituted or unsubstituted saturated or partially unsaturated hydrocarbyl group which optionally contains 1 to 4 heteroatoms, wherein $R_1$ is linked to $C_1$ and $R_2$ to $C_{1'}$, respectively, forming together with $C_1=C_{1'}$ a substituted or unsubstituted partially unsaturated cyclic hydrocarbyl or a substituted or unsubstituted aromatic hydrocarbyl ring moiety of 6 to 14 C-atoms;
  $R_3$ and $R_4$ are each independently H, substituted or unsubstituted saturated or partially unsaturated hydrocarbyl group which optionally contains one or more heteroatom(s), a substituted or unsubstituted aromatic hydrocarbyl group which optionally contains one or more heteroatom(s); or $R_3$ and $R_4$ together with the carbon atoms $C_1$ and $C_{1'}$ to which each, respectively, is attached form an unsubstituted or substituted partially unsaturated cyclic hydrocarbyl moiety which has carbon atoms and optionally from 1 to 4 heteroatom(s) as ring-atoms; or $R_3$ and $R_4$ together with the carbon atoms $C_1$ and $C_{1'}$ to which each, respectively, is attached form an unsubstituted or substituted cyclic aromatic hydrocarbyl moiety which has carbon atoms as ring-atoms and optionally from 1 to 4 heteroatom(s) as ring-atoms;
wherein the polymer composition has a crosslinkability expressed as a gel content of at least 56% when measured from a sample of the crosslinked polymer composition (ASTM D 2765-01, Method A, decaline extraction) when cross-linked only by the diradical generating compound.

* * * * *